United States Patent [19]

Arnone

[11] Patent Number: 4,827,591
[45] Date of Patent: May 9, 1989

[54] MANUALLY OPERATED CLIP ATTACHMENT APPARATUS WITH MOVABLE GATE AND DIE

[75] Inventor: David A. Arnone, Jamestown, N.Y.

[73] Assignee: Delaware Capital Formation, Inc., Apex, N.C.

[21] Appl. No.: 83,562

[22] Filed: Aug. 7, 1987

[51] Int. Cl.$^4$ ............................................. P23P 11/00
[52] U.S. Cl. ................................................. 29/243.56
[58] Field of Search ........... 29/243.56, 243.57, 526 R; 53/138 A, 583, 417; 116/285, 303, 298; 221/6

[56] References Cited

U.S. PATENT DOCUMENTS

| | | |
|---|---|---|
| 2,748,389 | 6/1956 | Buchy . |
| 3,115,733 | 12/1963 | Tipper . |
| 3,210,835 | 10/1965 | Tipper . |
| 3,224,083 | 12/1965 | Tipper . |
| 3,327,514 | 6/1967 | Tipper . |
| 3,381,359 | 5/1968 | Schroeder ........................ 29/243.57 |
| 4,004,339 | 1/1977 | Velarde ............................ 29/243.57 |
| 4,182,015 | 1/1980 | Niedecker . |
| 4,312,108 | 1/1982 | Tipper . |
| 4,387,886 | 6/1983 | Schlegel et al. ..................... 269/78 |
| 4,642,865 | 2/1987 | Kelem .............................. 29/243.56 |

FOREIGN PATENT DOCUMENTS 1284354 4/1966 Fed. Rep. of Germany .
2725359 4/1977 Fed. Rep. of Germany .

Primary Examiner—Robert C. Watson
Attorney, Agent, or Firm—Allegretti & Witcoff, Ltd.

[57] ABSTRACT

A clipper for attachment of U-shaped metal clips about flexible casing includes a single vertical main body plate supported on a platform or stand. The clipper further includes a pivotal gate which defines, in part, a clip channel for receipt of the U-shaped metal clips. The gate moves between an open position wherein deformable casing may be positioned in the throat opening defined by the gate to a closed position. A manual lever arm is pivotally attached to the main body plate and cooperates with a drive mechanism, which operates not only to pivot the gate but also to drive a punch in a channel in the main body plate. U-shaped metal clips are driven by the punch in the channel from a clip magazine, which is affixed to one side of the main body plate.

6 Claims, 3 Drawing Sheets

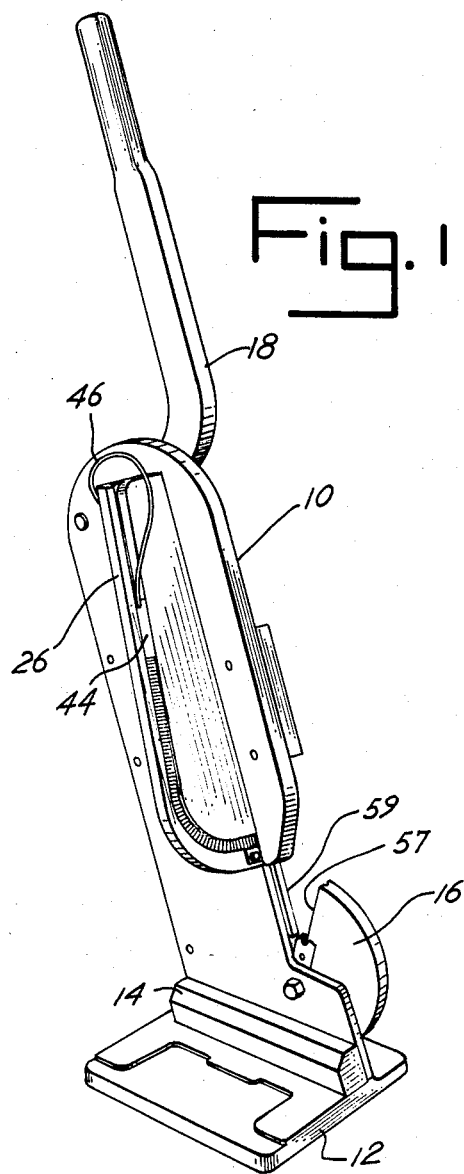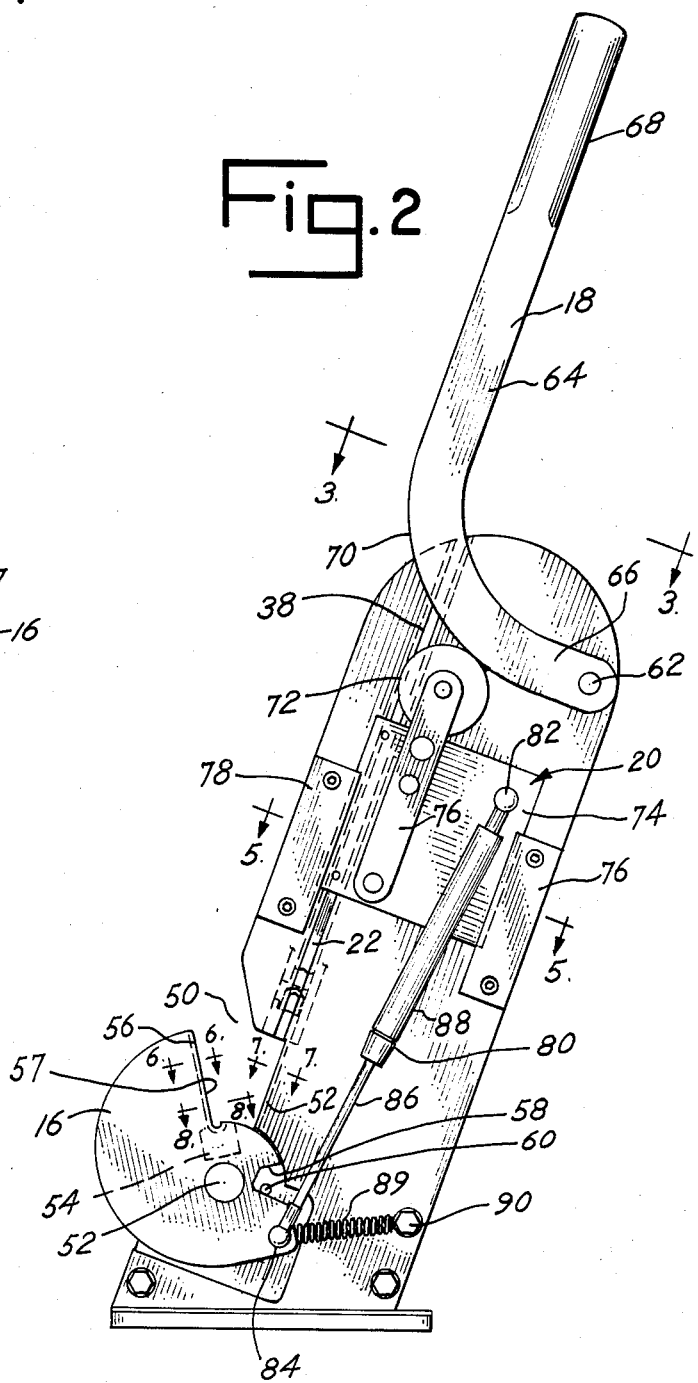

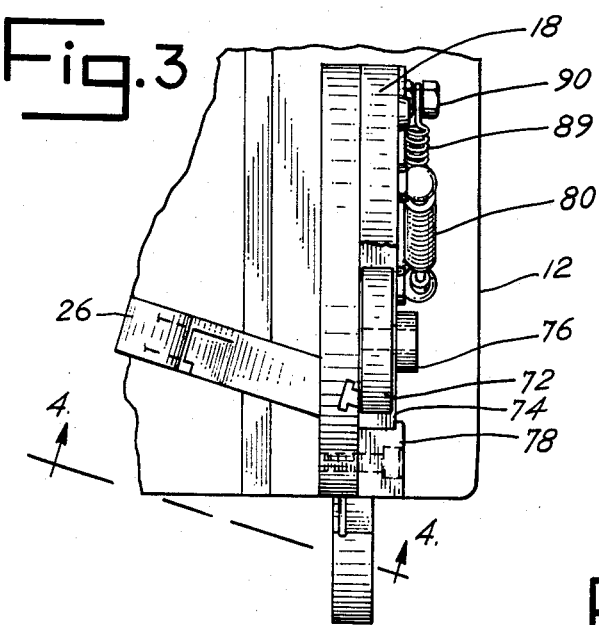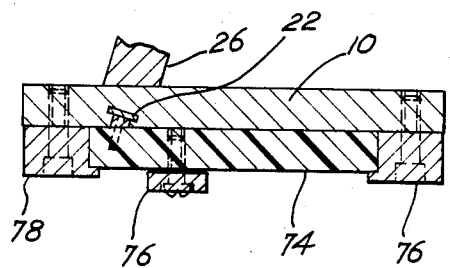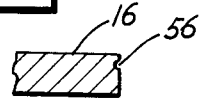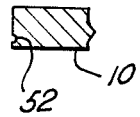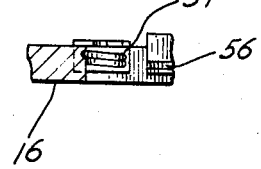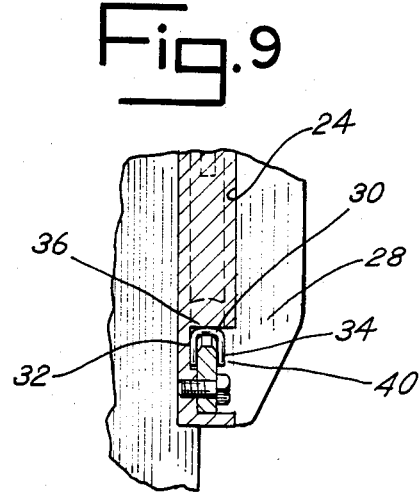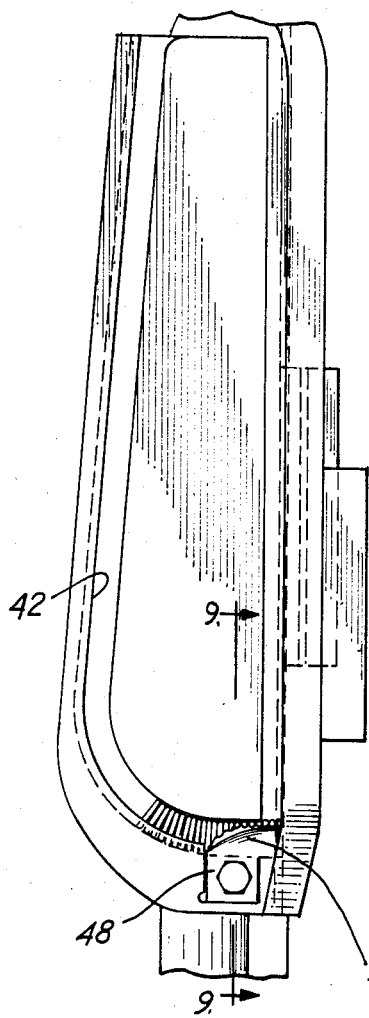

MANUALLY OPERATED CLIP ATTACHMENT APPARATUS WITH MOVABLE GATE AND DIE

BACKGROUND OF THE INVENTION

This invention relates to an apparatus for applying a permanent fastener, such as a U-shaped metal clip, about an article. The apparatus is particularly adapted for applying a metal clip or staple about the end of a flexible, deformable casing or bag enclosing a product such as a food stuff.

Heretofore application of metal fasteners of the type described could be achieved using a portable manually operated apparatus such as depicted in Tipper U.S. Pat. Nos. 3,224,083 and 3,327,514. These prior patents disclose that a U-shaped metal clip may be fed through a slot into a channel where the clip is engaged by a punch and driven through the channel toward a die. The legs of the U-shaped metal clip are deformed about previously compacted flexible material against the die. The apparatus typically includes a manually operated lever arm or handle which engages and drives the punch in the manner described.

Buchy, in U.S. Pat. No. 2,748,389, discloses a stapler or clipper for a sausage package which is operated by a foot peddle that drives a punch into engagement with a U-shaped metal clip positioned in a channel.

While the aforementioned references disclose manually or foot operated clippers which are useful, there has remained the need for a simplified, less expensive, and highly reliable clipper or clip attachment apparatus for attaching U-shaped metal clips about flexible or deformable casing or bag material which encloses various products. This desire motivated the development of the present invention particularly the simplified construction of the mechanical drive linkage which engages and drives the clip punch.

SUMMARY OF THE INVENTION

In a principal aspect, the improved clipper of the present invention is generally comprised of a single vertical main body plate supported on a platform or stand. The clipper further includes a pivotal gate which defines, in part, a clip channel for receipt of U-shaped metal clips. The gate moves between an open position wherein deformable casing may be positioned in the throat opening defined by the gate prior to movement to a closed position. A manual lever arm is pivotally attached to the main body plate and cooperates with a drive mechanism, which operates not only to pivot the gate to the closed position but also to drive a punch in a channel in the main body plate. U-shaped metal clips are driven by the punch in the channel from a clip magazine, which is affixed to one side of the main body plate about casing material. In this manner the clip is deformed about casing material.

Thus, it is an object of the invention to provide an improved and simplified manually operated clipper or clip attachment apparatus.

Yet another object of the invention is to provide a manually operated clip attachment apparatus which utilizes a pivotal lever arm having a handle at one end and a pivot point at its opposite end with intermediate ca drive surface for engaging and driving a roller and attached punch against a U-shaped metal clip in a clip channel.

Yet a further object of the invention is to provide an improved manually operated clipper having the fewest number of parts.

Yet another object of the invention is to provide a manually operated clipper which is operated by pulling on a manual lever arm in the direction of punch travel and thus in the direction of movement of the clip during attachment.

Yet another object of the present invention is to provide a manually operated clipper which provides a maximum amount of mechanical advantage and thus clip driving force and clip forming force in a compact and simplified mechanism.

Another object is to provide a clipper having a movable gate and punch both operated by a manual lever.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a perspective view of the improved clipper of the invention;

FIG. 2 is a side elevation of the clipper of FIG. 1;

FIG. 3 is a cross sectional end view of the clipper of FIG. 2 taken substantially along the line 3—3;

FIG. 4 is a partial elevation of the clip magazine taken substantially along the line 4—4 of FIG. 3;

FIG. 5 is a cross sectional view taken substantially along the line 5—5 in FIG. 2;

FIG. 6 is a cross sectional view taken substantially along the line 6—6 in FIG. 2;

FIG. 7 is a cross sectional view taken substantially along the line 7—7 in FIG. 2;

FIG. 8 is a cross sectional view taken substantially along the line 8—8 in FIG. 2 illustrating the position of the die in the movable gate;

FIG. 9 is a cross sectional view of the feed window leading from the clip magazine into the clip channel and taken substantially along the line 9—9 in FIG. 4;

DESCRIPTION OF THE PREFERRED EMBODIMENT

General Overview of Apparatus

Figure 10:
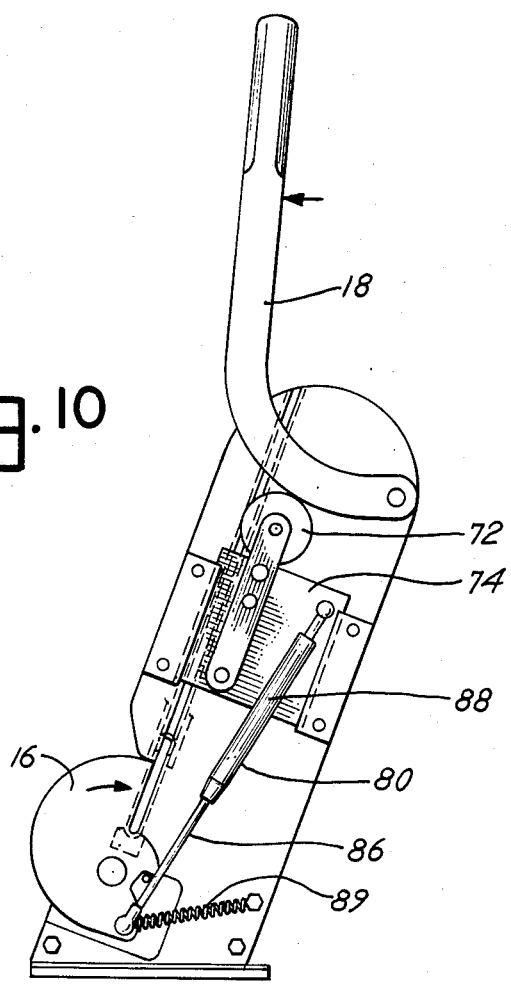
FIG. 10 is a side elevation similar to FIG. 2 wherein the manual lever arm has been partially displaced to effect closing of a clip channel gate and partial movement of a clip driving punch.

Referring to FIG. 1, the improved clipper of the present invention is generally comprised of a single vertical main body plate 10 supported on a platform or stand 12 both of which are fabricated from a plate or metal material such as an aluminum alloy. The plane 10 is supported by the plate 12 and attached thereto by means of a support bracket or brace 14 which is connected by fasteners to plate 12 as well as to plate 10. In this manner the plate 12 serves to rigidly support the plate 10 and thus support the entire clipper.

The clipper further includes a pivotal gate 16 which defines, in part, a clip channel for receipt of U-shaped clips. The gate 16 moves between an open position depicted in FIG. 2, wherein deformable casing may be positioned in the throat opening defined by the gate, to a closed position illustrated by FIG. 10 and FIG. 11.

A manual lever arm 18 is pivotally attached to the main body plate 10 and cooperates with a drive mechanism, generally shown at 20, which operates not only to pivot the gate 16 but also to drive a punch 22 in a channel 24 in the main body plate 10. U-shaped metal clips are driven by the punch 22 in the channel 24 from a clip magazine 26, which is affixed to one side of the main body plate 10, about casing material.

Specific Construction

Referring to FIGS. 1–9, the main body plate 10 is a generally planar plate member having a longitudinal channel 24 extending therethrough defining punch and clip receiving channel. As illustrated in FIG. 5, the planar sides of the rectangular cross section channel 24 are canted with respect to the planar sides of the plate 20. This is not a limiting feature of the invention and is merely depicted to illustrate that the channel 24 may be arranged in any desired orientation to guide U-shaped metal clips, such as a clip 28 in FIG. 9 having a crown 30 and legs 32 and 34, down the pathway defined by the channel 24.

The legs 32 and 34 of clip 28 are spaced by the crown 30 approximately the distance of the major width of the channel 24. A clip 28 thus slides easily within the channel 24 and is guided by the channel 24. The punch 22, which includes a leading edge 36 as shown in FIG. 9, engages crown 30 to drive the clip 28 in the channel 24.

A longitudinal slot 38, as shown in FIG. 2, extends through the plate 10 along the length of the channel 24. The width of the slot 38 is less than the width of the channel 24 so that a clip 28 will not accidentally fall out of the channel 24 and so that the punch 22 will also be appropriately retained within the channel 24.

On the side of the plate 10 opposite the slot 38, a clip window or clip passage 40 in FIG. 9 is defined. The clip passage 40 connects from the channel 24 and extends generally transversely from that channel 24 through the plate 10 to a clip magazine channel 42 defined in the magazine 26 a shown in FIG. 4. That is, U-shaped metal clips 28 are positioned in the magazine channel 42 with the crown 30 of the clips 28 engaged against the inside arcuate path of the channel 42 and the legs extending radially outward therefrom. This ensures that the clips 28 are properly oriented with respect to their ultimate use and function. Additionally, the crowns 30 are attached by a flexible tape, for example, so that when the assembled stack of clips are arranged in the channel 42 as depicted in FIG. 4, they can easily move in that channel 42 and down that channel 42 toward the window 40. Note that the magazine 26 is also oriented transverse to the canted or inclined clip channel 24. This is illustrated in FIGS. 3 and 5, for example.

The clips are retained in the channel 42 by means of a weight 44 retained by a cable 46. The clips 28 are guided into the window 40 by means of a clip guide block 48 which is arranged at the lower end of the channel 42. The clip guide block 48 defines a support which fits on the underside of the crown 30 as depicted in FIG. 4 and which includes, in essence, a camway guide surface 49 for guiding clips into the window 40 as depicted in FIG. 4. The clips 28 thus are fed along the channel 42 and into channel 24 one at a time. The dimensions of the channel 2 are such that only a single clip 28 can be received for passage along that cannel 24 due to operation of the punch 22.

As shown in FIG. 2, the lower end of the plate 10 includes an open throat 50 into which the channel 24 is directed. One side of the throat 50 defines a straight line slot 51 as shown in FIG. 2 and in FIG. 7 which is a continuation of the channel 24. The slot 51 thus serves to guide a leg 34 of a clip 28 passing along the channel 24. The opposite side of the throat 50 is, however, open. Positioned at the lower end of the throat 50 is the gate 16 which is pivotally attached by a pivot rod 52 to the plate 10. The gate 16 has a unique construction and shape. As depicted in FIGS. 2, 6 and 8, the gate 16 includes a die block 54 positioned above the pivot shaft or rod 52. Die or die block 54 typically includes parallel arcuate slots, as shown in FIG. 8, to guide the deformation of legs 32, 34 respectively. Note that the pivot shaft or rod 52 pivots about an axis which is aligned with approximately the midpoint of the channel 24. Thus, pivoting about the axis of the rod 52 will position the midpoint of the die block 54 in the path of punch 22 and a clip 28.

The gate 16 also includes a longitudinal groove 56 along one side 57 thereof. The groove 56 defines a portion of a channel for receipt of the leg 32 associated with a clip 28 when the gate 16 is rotated to the position as depicted in FIG. 10. Again, note the relative positions of the pivot point of the rod 52 for the gate 16 and that the straight line longitudinal slot or groove 56 is aligned with respect to the axis of rod 52 so as to ensure proper spacing from the groove 51 when the gate 16 is pivoted as shown in FIG. 10. However, the side 57 of the gate 16 remains spaced from the opposed side 59 of plate 10 so that casing, material, for example, can be compressed between sides 57, 59.

Figure 11:
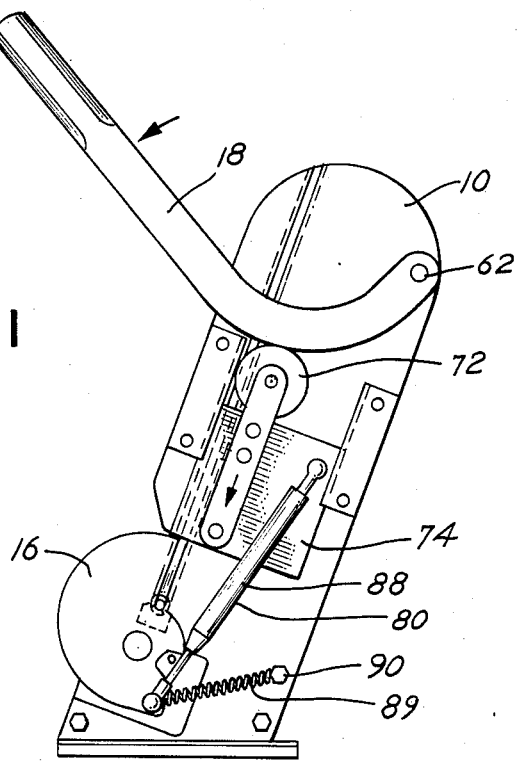
FIG. 11 is a side elevation similar to FIG. 10 wherein the manual lever arm has been fully pivoted to drive the punch into engagement with a clip and thereby form the clip about the gathered casing material.

The gate 16 includes a slot 58 into which a pin 60 projecting from the plate 10 can fit. The pin 60 limits the pivotal motion of the gate 16 in both the clockwise and counterclockwise directions. Thus, as shown in FIG. 2, the pivotal movement of the gate 16 in the counterclockwise direction is limited by the pin 60. This limits the amount of opening into which compressible or deformable casing material may be placed. As shown in FIG. 11, the pin 60 limits the clockwise movement of the gate 16 so that the gate 16 will be properly aligned and more particularly the slot or groove 56 will be properly aligned with the channel 24 for passage and guidance of a clip 28.

The lever arm 18 includes a pivot attachment pin 62 defining a pivot axis for attachment of the lever arm 18 to the plate 10. The lever arm 18 is generally L-shaped with a smooth arcuate connection between generally straight line runs 64 and 66 defining the arm 18. A manually operated handle 68 is provided at the distal end of the lever arm 18. The arcuate connection between the segments or runs 64 and 66 defines a cam drive surface 70.

The cam drive surface 70 cooperates with a surface of roller or follower 72 which is attached to a slide block 74 by means of a brace 76. The slide block 74 slides in the direction of the channel 24 and is retained in position by guide blocks 76 and 78 attached to the outside surface of the plate 10. The slide block 74 is pinned or attached to the punch 22 by fasteners which extend through the slot 38. In this manner, as the slide block 74 is moved vertically or along the path defined by the guide blocks 76 and 78, the punch 22 will simultaneously move therewith.

Movement of the slide block 74 is effected by operation of the handle 18. Thus, the lever arm 18 moves between the position disclosed in FIGS. 2 to the position in FIG. 10 and thence to the position in FIG. 11 in order to effect movement of the punch 22.

Attached to the slide block 74 is a compressible link or spring 80. The compressible link or spring 80 is connected at one end by a pivot 82 to block 74. At its opposite end, the link or spring 80 is connected at a pivot point 84 to the gate 16. The connection of pivot point 84 is spaced from the pivot axis or pivot pin 52 of gate 16 by a radial distance in order to define a lever arm which will initiate pivoting action of the gate 16 in response to movement of the block 74. Thus, downward movement of the block 74 will initially cause the gate 16 to move in the clockwise direction to the position illustrated in FIG. 10. Subsequently the pin 60 will engage the gate 16 and terminate permitted pivoting action. The compressible link, which is a compressible spring 80, will then contract with the rod 86 thereof being retracted into the cylinder 88 of the compressible spring 80 as illustrated in FIG. 11 while the block 74 continues to slide and drive the punch 22 downward against a clip 28.

A tension spring 89 connects between the pivot point 84 and a pin or fastener 90 attached to the plate lo. The tension spring 89 drives or biases the gate 16 in the counterclockwise direction. The force of the tension spring 89 must therefore be overcome by the compressible link 80 as the lever arm 18 is moved in the sequence illustrated by FIGS. 2, 10 and 11.

Operation

The operation of the device is as follows:

Referring first to FIG. 2, the clipper is disclosed in the position prior to placement of deformable casing material, for example, in the throat 50. The first step in the operation, therefore, is to position deformable casing material in the opening of the throat 50. This is done manually. It is presumed, of course, that clips 28 are already retained within the channel 24 and that the clipper is ready for operation.

Subsequently the handle 68 is grasped so that the manual lever arm 18 can be pivoted in a counterclockwise direction about the pivot pin 62 as depicted in FIG. 10. This causes the gate 16 to pivot in the clockwise direction as the guide block 74 moves downward and causes the compressible linkage 80 to drive the gate 16.

FIG. 10 illustrates the gate 16 in the fully closed position wherein the deformable casing material is compressed between the gate 16 and the plate 10. The punch 22 is moved slightly downwardly in the channel or track 24 and initially engages the clip 28 moving it downward in the channel 24.

The handle 68 is then further moved to pivot the lever arm 18 about the pivot point 62 to the position shown in FIG. 11. This causes the guide block 74 and thus the attached punch 22 to drive the clip 28 downwardly through the channel formed by the slots 52 and 56 about the casing material and ultimately to engage the legs 32, 34 of clip 28 against the die block 54. During this sequence of operation, the compressible linkage 80 will be compressed by the movement of the block 74.

Upon completion of the clip attachment operation, the sequence is reversed. The handle 68 is thus returned to its original position. This permits the block 74 to reverse its path. The reversal movement of block 74 is effected by the compressible spring or link 80 which expands when manual force is released from the lever arm 18. This retracts the punch 22 in channel 24. Ultimately the block 74 reaches the position depicted in FIG. 10 at which time the spring 89 will cause the gate 16 to pivot about its pivot rod 52 to the position shown in FIG. 2. Thus, movement of gate 16 is effected by operation of the tension spring 89 which pivots the gate 16 in the counterclockwise direction and also simultaneously thereby tends to move the block 74 upwardly. This effectively causes the follower 72 to follow the cam surface 70 defined by the lever arm 18 when manual force is released on lever arm 18.

Various modifications of the specific components of the device may be implemented. The position of the channel slots 52, 56 and channel 24 may be adjusted. The specific construction of the follower 72 and lever arm 18 may be altered. The configuration of the gate 16 may be altered by way of example. Thus, the invention is to be limited only by the following claims and their equivalents.

What is claimed is:

1. An improved manually operated clipper of the type for attaching U-shaped metal clips about gathered material comprising, in combination:
   (a) a generally planar main body plate including a longitudinal punch guide and clip channel in the plate with a lower end, said channel having a connected punch drive slot through one side of the plate, a clip window in the opposite side of the plate, and an open throat at the lower end, whereby only one side of the channel is defined by the main body plate at the lower end;
   (b) a pivotal gate member attached to the main plate, said gate member pivotal about an axis generally transverse to the plate between a throat open and a throat closed position, said gate defining a portion of one side of the clip channel at the lower end and also supporting a die at the extreme lower end for forming the clips;
   (c) a punch slidably mounted in the channel and biased normally to a retracted position away from the lower end and for access through the clip window to the channel;
   (d) a manual lever arm having a manual handle at one end and pivotally attached at its opposite end to the main plate to pivot about an axis transverse to the direction of the channel between a punch retracted position and a punch extended position, said lever arm having a cam drive surface;
   (e) a slide block slidably mounted on the body plate for movement generally in the direction of the punch and connected to the punch through the punch drive slot;
   (f) bearing means attached to the block and defining a follower engageable with the cam drive surface of the handle, said bearing means operative to transmit pivoting motion of the handle to translational motion of the block and the connected punch in the channel toward the die; and
   (g) compressible linkage means pivotally connected respectively to the movable block and to the pivotal gate for driving the gate from the throat open to the throat closed position upon translational movement of the block by pivoting the gate by means of the linkage means upon initial actuation of the arm, and subsequently upon closing of the gate said linkage means effectively decoupling from further pivotal action thereof as the arm continues to translate the block and the punch in the channel towards the die.

2. The clipper of claim 1 wherein the collapsible linkage comprises a compressible gas spring pivotally attached at its opposite ends to the gate and bearing means respectively.

3. The clipper of claim 1 including a stop member for engaging the gate and limiting pivotal travel thereof.

4. The clipper of claim 1 wherein the arm defines a cam way and the bearing means defines a cooperative follower.

5. The clipper of claim 1 including a clip magazine cooperative with the clip window for feeding unitary clips into the clip channel.

6. The clipper of claim 1 including a stop member for limiting pivotal motion of the arm away from the bearing means.

* * * * *